US011140056B2

(12) United States Patent
Maltz et al.

(10) Patent No.: US 11,140,056 B2
(45) Date of Patent: *Oct. 5, 2021

(54) FLEXIBLE AND SAFE MONITORING OF COMPUTERS (71) Applicant: Microsoft Technology Licensing, LLC, Redmond, WA (US)

(72) Inventors: David A. Maltz, Bellevue, WA (US); Jonathan David Goldstein, Kirkland, WA (US); Albert Greenberg, Redmond, WA (US); Charles Loboz, Redmond, WA (US); Parveen K. Patel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,763

(22) Filed: Apr. 4, 2019

(65) Prior Publication Data
US 2019/0238437 A1    Aug. 1, 2019

Related U.S. Application Data (63) Continuation of application No. 15/004,113, filed on Jan. 22, 2016, now Pat. No. 10,298,477, which is a
(Continued)

(51) Int. Cl.
*G06F 15/173* (2006.01)
*H04L 12/26* (2006.01)
(Continued)

(52) U.S. Cl.
CPC ........ *H04L 43/0876* (2013.01); *G06F 9/5027* (2013.01); *G06F 11/3006* (2013.01);
(Continued)

(58) Field of Classification Search
CPC ............. H04L 43/0876; H04L 43/0817; G06F 16/951; G06F 11/3006; G06F 11/3072; G06F 11/3093
See application file for complete search history.

(56) References Cited

U.S. PATENT DOCUMENTS 7,155,715 B1 * 12/2006 Cui ........................... G06F 8/75
717/177
2002/0152305 A1 * 10/2002 Jackson ................ H04L 41/509
709/224

(Continued)

*Primary Examiner* — Suraj M Joshi
*Assistant Examiner* — Jaren Means (57) ABSTRACT Described is a server monitoring technology that is scalable to large numbers of servers, e.g., in a datacenter. Agents on servers run queries to monitor data sources for that server, such as performance counters and other events. The agents monitor their resource usage and those of monitored events to stay within an administrator-specified resource budget (policy), e.g., by modifying the running queries and/or monitoring parameters. A controller receives results of the monitoring, analyzes the results, and takes action as needed with respect to server operation and monitoring. The controller may dynamically update an agent's queries, monitoring parameters and/or monitored data post-processing operations. The controller may issue alerts and reports, including alerts indicative of inter-server problems between two or more servers.

20 Claims, 5 Drawing Sheets

Related U.S. Application Data continuation of application No. 12/825,336, filed on Jun. 29, 2010, now Pat. No. 9,274,842.

(51) Int. Cl.
  *G06F 16/951* (2019.01)
  *G06F 11/30* (2006.01)
  *G06F 11/34* (2006.01)
  *G06F 9/50* (2006.01)

(52) U.S. Cl.
  CPC ...... *G06F 11/3072* (2013.01); *G06F 11/3093* (2013.01); *G06F 11/3409* (2013.01); *G06F 11/3495* (2013.01); *G06F 16/951* (2019.01); *H04L 43/0817* (2013.01); *G06F 2201/88* (2013.01); *G06F 2209/5013* (2013.01)

(56) References Cited

U.S. PATENT DOCUMENTS

| | | | | |
|---|---|---|---|---|
| 2004/0103193 | A1* | 5/2004 | Pandya | H04L 43/0858 709/224 |
| 2009/0118845 | A1* | 5/2009 | Eldridge | G05B 19/41845 700/86 |

* cited by examiner

FLEXIBLE AND SAFE MONITORING OF COMPUTERS

BACKGROUND

Data center management is based upon monitoring the servers in a data center. For example, monitoring of the servers provides the information needed to determine the health of systems, often providing the first warning that problems are occurring, and also assisting in the localization and debugging of those problems. Monitoring also provides information regarding the utilization of servers, which figures into capacity planning and provisioning decisions.

Successfully monitoring servers depends on instructing the servers to measure desired characteristics in a manner that does not overwhelm the servers' resources. The instructions the servers use to measure themselves often need to be customized.

Servers are well instrumented, producing far more data about their status than can realistically be stored locally on the server or sent elsewhere for analysis. As a result, processes called server monitoring agents are typically deployed to or deployed nearby the servers, with the agents responsible for extracting the part of the data deemed interesting by the data center operators, and forwarding this part or a summary for further analysis. However, because there is still too much data, a large amount of this data is lost.

Contemporary monitoring agent processes may consume so many server resources (e.g., CPU, memory, disk space, I/O bandwidth and so forth) that the primary functionality of the server (e.g., serving content) is adversely impacted. Resources consumed by monitoring can, for example, distort SLA (service level agreement) measurements. As a result, many of the agents that are deployed are typically extremely limited in the processing they perform, thereby limiting the value of the information they can provide. Data that is needed for anomaly detection, debugging, and system management are often not available, especially as the developers and operators may not realize what information is important until after the system is deployed and experience with operating it is obtained.

Because of their potential impact on server performance, agents and their processing rules typically need to undergo extensive qualification testing before deployment is allowed. Having to re-qualify an agent every time a change is made to its processing rules makes it difficult to refine the agents, even though such refinement is highly desirable.

Further, monitoring a large set of servers creates additional challenges. These challenges typically need to be overcome by relying on the experience of a system administrator, e.g., to identify unusual or potentially performance-threatening situations in the system. By way of example, consider monitoring to identify unusual or potentially performance-threatening situations; such situations may differ significantly depending on the underlying architecture, processing mode (batch, transaction, failover), time of day (peak, off-peak) and so forth. For example, detecting ninety percent processor utilization for several minutes may trigger an alert for most transaction-processing applications. However, the same level of processor utilization is normal in batch processing, and indeed for some types of batch processing, any lower utilization should trigger an alert, as utilization below ninety percent may suggest that the application stopped is not performing the expected work or even stopped working.

At the same time, system behavior is described by hundreds of variables, and any combination of them may need to be used to spot and alert on the occurrence of some problem. For example high CPU utilization may be a problem only when occurring simultaneously with lower than usual utilization of a disk drive with database logs.

Because of these difficulties, known approaches to server monitoring do not scale well to a large number of servers, because of their numbers (possibly on the order of hundreds to one-hundred thousand servers), load patterns and the dynamic nature of a contemporary data center. Modern data centers may have tens of thousands of servers, for example, running hundreds of differing applications, serving a load coming from (e.g., Internet-connected) clients in a mostly uncontrollable fashion. In addition, the servers may be frequently re-purposed to serve a different application, which completely changes the load pattern on the re-purposed server. Setting individual alerts on each server by a system administrator is not a practical solution.

Yet another problem with conventional monitoring approaches is that they concentrate and report the performance metrics directly available from the system at the moment. The monitor does not have other information, such as what is considered a normal situation based upon the given time of the day or other knowledge (e.g., a holiday). Instead, the alerts and/or data collection rules are set for some 'average' situation, like weekday or weekend, but that does not account for differences between weekends during holiday period and other weekends, for example. It is sometimes technically possible to create such a multitude of parameter settings, but it is presently impractical to apply them as the load patterns vary from time to time.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards monitoring servers via dynamically controlled query engines (agents) that are limited in the resources they consume, and may be dynamically updated to collect desired results for analysis; (note that as used herein, a "query engine" does more than process queries, including that it manages and controls the functionality of the agent). In one aspect, a dynamic query engine comprising an agent runs queries on a server to collect monitoring data from one or more data sources. The query engine monitors the agent's resource usage with respect to a policy-specified resource budget, and dynamically modifies the queries and/or monitoring parameters as needed to remain within the policy-specified resource budget. The query engine also may compute estimates of the resource usage from creating events corresponding to the monitoring data, so as to include the estimates as part of monitoring the agent's resource usage.

In one aspect, the query engine includes a scheduler that dynamically modifies a query to remain within the resource budget by pausing the query, suspending the query, stopping the query or changing a thread priority of the query. To remain within the resource budget, the query engine may dynamically modify the queries/monitoring parameters by sampling to obtain less than all of the data provided by a data source, and/or by aggregating the data provided by a data source into a lesser amount of data.

In one aspect, a controller receives the results corresponding to the monitoring data collected from the servers. The controller analyses the results for a server, and based upon the analysis may reconfigure the queries and/or monitoring parameters used by the agent on that server so as to alter the monitoring data collected by that server. The controller may also reconfigure any post-processing performed by the agent on the data, so as to obtain a different aggregation level (or transformation type) of the results.

The controller may output an alert and/or a report based upon the analysis. The controller also may compare the analyses of two or more servers to output an alert corresponding to an inter-server problem The controller may process historical data to determine a pattern corresponding to a previous operating state of the server, and use the pattern in evaluating the current operating state versus the prior pattern. The controller may uses the analysis associated with one server to configure another server, e.g., a new server running a similar or the same application as the server, and/or having similar or the same machine configuration parameters.

In one aspect, a feedback loop is provided between the query engine (agent) on the server and the controller. The controller receives results corresponding to monitoring data of a monitored server. The controller analyzes these results, and uses the analysis to modify a monitoring information set, comprising one or more queries/one or more monitoring parameters, which the controller then sends to the agent. The agent changes its monitoring based on the modified monitoring information set, whereby the controller gets modified results, which the controller may analyzes and use to again modify the information set, and so on.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a monitoring system, including an agent comprising a lightweight data collection and analysis module that runs with respect to monitored machines, particularly servers, along with the components (e.g., including a logically centralized controller) that use the collected data for various management purposes. The agent is dynamically reconfigurable whenever needed, while providing secure limits on resource consumption, such that monitoring does not interfere with a monitored machine's functionality beyond the limits set by an administrator. The agent supports sophisticated data collection queries and data summaries, and the process of setting up these queries and summaries can be achieved remotely over a network.

As will be understood, the agent scales to large networks by moving computation to the data, in a safe fashion. The resources consumed by monitoring on the servers are minimized and controlled. Only a small amount of data that is needed to assess the health of each server (e.g., continuously) is sent over the network. Further, the controller has sufficient information to characterize the behavior of the servers over time, whereby the usefulness of the data retrieved from the servers may be improved over time.

While the examples herein are generally directed towards a large number of servers in a network data center, e.g., each running a version of the Microsoft Windows® operating system, the technology provides benefits with any number of computing machines, and is applicable to any operating system. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and computer monitoring general.

Figure 1:
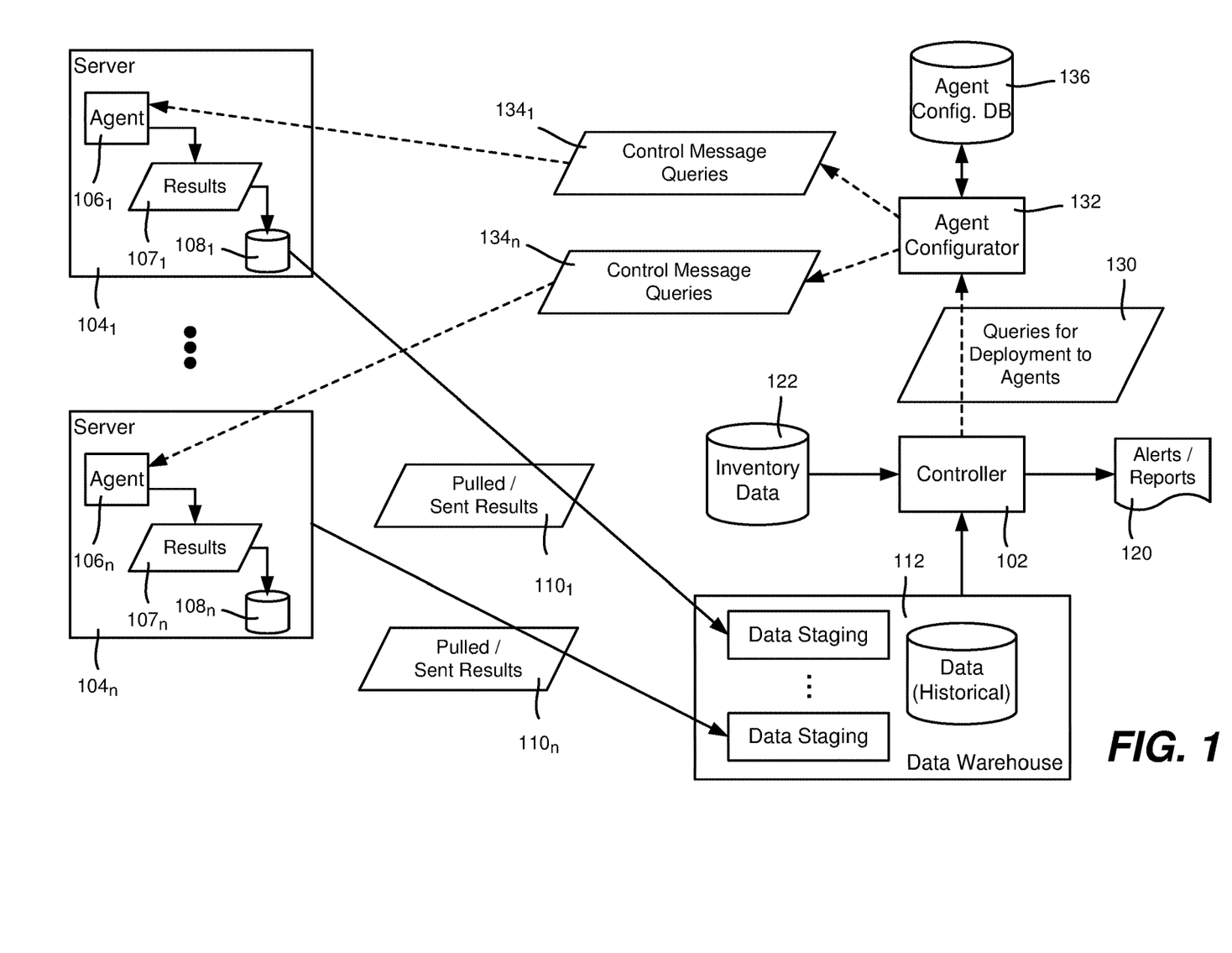
FIG. 1 is block diagram representing a network having servers monitored by agents that report to a controller, which in turn can adjust the agents' monitoring in a feedback loop.

FIG. 1 shows a computer/network environment in which a feedback loop exists between one or more server-monitors (comprising the "agent" or "agent modules" as referred to herein) and a controller 102 that in general operates a data processing and analysis system. In one implementation, it is beneficial to have the controller 102 run on some machine other than the monitored servers $104_1$-$104_n$.

As represented in FIG. 1, an agent $106_1$-$106_n$ is deployed to each server $106_1$-$106_n$, and each agent collects its server's data. This is represented in FIG. 1 by the monitoring results $107_1$-$107_n$ being collected at each server, with some local data store $108_1$-$108_n$ (e.g., a buffer) typically maintaining the data until delivered as pulled and/or sent results $110_1$-$110_n$.

Note that in an alternate embodiment (described below with reference to FIG. 4), data from multiple servers may be sent to a data aggregation/filtering server or the like that includes an aggregation agent module that operates on data from each of the multiple servers. In other words, multiple servers send their data to another server that contains an aggregation agent. This can be generalized to any hierarchical arrangement, e.g., multiple servers may send their data to a data aggregation/filtering server, with multiple data aggregation/filtering servers sending their data to another aggregation server having a monitoring agent, e.g., running queries as described herein, and so forth.

The data (results $110_1$-$110_n$) collected from the servers $104_1$-$104_n$ are analyzed in the controller 102, which may be after some staging, and/or after maintaining as historical data, as represented in FIG. 1 by the data warehouse 112. Note that the data or data summaries may be stored for later use, such as for comparison with current data. As described below, the controller 102 may adjust the monitoring parameters and/or agent operation on any server $104_1$-$104_n$ based on the results of the analysis.

Figure 2:
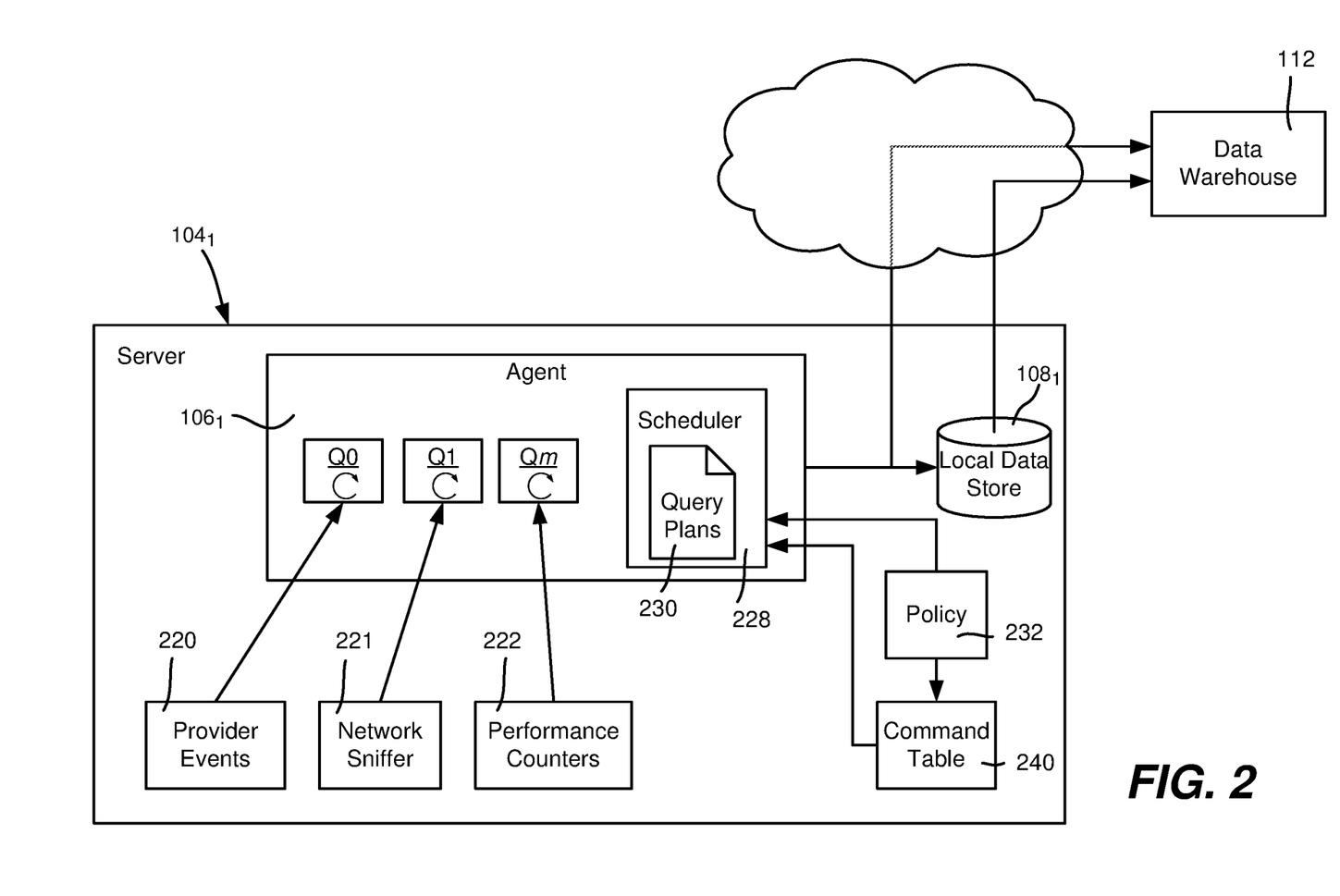
FIG. 2 is a block diagram representing an example agent monitoring a server via scheduled queries, in which the agent is controlled to remain within a resource budget.

FIG. 2 is a block diagram showing various aspects of an example agent, e.g., the agent $106_1$ operating on a machine being monitored, namely the server $104_1$ in this example. In one implementation, agents run as user-level programs in the Windows® operating system, and each agent may include input adapters for various data sources such as for ETW (Event Tracing for Windows) channels, TDI-level network packet traces, WMI performance counters, and event logs.

In general, the agent $106_1$ uses rules, referred to as queries, to monitor the hosting server and/or other servers. The data obtained from these queries corresponds to the results $110_1$ that are delivered to the controller 102, which the controller 102 receives and processes along with results from other agent modules. Note that the output of one query can be used as input of another query in the same agent (query engine), and/or may be used as input of another query in another query engine.

The agent $106_1$ (module) collects data as defined by the queries Q1-Qm (also represented as curved arrows) currently loaded into it, with collection at regular intervals, for example. Data reduction and data mining queries may be expressed as XML documents using a defined schema, for example.

The following table shows an example query that finds all values of CPU utilization that are over ten percent:

```
<CedrQuery>
    <Operator OperatorType="Export" MetadataName="OutputSingleInt"
        InitString="$(ThisOutputDataFile)">
        <Operator OperatorType="Select" Name="Select10">
            <Expression ExpressionType="GreaterThan">
                <Expression ExpressionType="Column" Name="perf"/>
                <Expression ExpressionType="Constant" Value="10"
        CLRType="System.Int32"/>
            </Expression>
            <Operator OperatorType="Import" MetadataName="PerfCounterInputAdapter"
        InitString="Category=Processor;Counter=% Processor
        Time;Instance=_Total;MaxEvents=-1"/>
        </Operator>
    </Operator>
</CedrQuery>
```

The agent $106_1$ processes the received data into the results $110_1$ as appropriate, and saves it, drops it, or sends it elsewhere according to the instructions given by the queries. In the example of FIG. 2, the agent $106_1$ receives data from one or more data sources 220-222 as directed by the queries Q0-Qm currently running inside the agent. Example data sources include provider events (e.g., instrumentation events such as ETW), a network sniffer 221, and performance counters 222.

The agent (and/or another associated component) may process the data into the results in any way, such as by computing histograms, computing smoothed or aggregated versions of data or events, comparing current values of data to a "gold standard" that shows the expected values as a function of time, comparing current values or a temporally smoothed stream of data to thresholds, checking for the co-occurrence of a plurality of events or data values during some time interval, and so forth. The data may be otherwise processed into the results $110_1$ (e.g., correlated, aggregated, and/or filtered) as desired by the agent $106_1$, with the results $110_1$ stored locally in the data store $108_1$ for delivery to the data warehouse 112 for further analysis.

A scheduler 228 (shown as incorporated into the agent module, but alternatively a separate component) introspects on the resources used by the agent $106_1$ and the active data sources 220-222, and polices them to obey a resource budget specified by the administrator as part of the configuration. In general, the administrator specifies a resource "lockbox" around the agent, such that the agent may not consume more than some percent of the CPU load, some amount of disk space, some amount of memory usage, disk I/O, network I/O and so forth, as specified via policy 232.

To enforce the budget, the scheduler 228 accesses the policy 232 and alters query plans 230 and/or adjusts dynamic task scheduling as needed to remain within the budget. For example, at any time the scheduler 228 may change the queries being run by the agent $106_1$, which in turn may modify the data sources the agent is using, the rate it pulls data from them, the calculations performed on the data, and/or the method for saving or transferring the data.

The agent and scheduler may be considered a dynamic query engine located on a server for data reduction and/or monitoring. Such a query engine monitors its own resource consumption, as well as estimates the resource requirements of creating the events that feed the system, and includes these estimates in its resource computations. For example, ETW channels have almost no cost unless there is a listener, but once there is a listener, some channels become much more expensive than others. The dynamic query engine polices and mitigates the impact of its queries to stay within the resource budget.

For example, the performance impact of an ETW provider may be measured by considering the resources used by a query before turning on the provider, versus after. As an ETW instrumentation event comes into the agent, the cost may be computed based on the number of events per second (which is known to the agent) versus the resource consumption, which can be used to estimate the resource consumption as the number of events per second changes.

Further, the query engine's data sources, data reduction and computations and output methods can be dynamically reconfigured as needed. The reconfiguring may be performed to support monitoring of servers/applications in a datacenter, e.g., as better health metrics for each application are discovered over time by operators.

Thus, the agent/scheduler monitors its own operation to identify the amount of memory, CPU, disk I/O and network I/O operations and other resources that are being used by every operator in every query. The agent attempts to estimate the impact on the system of collecting the data being fed into the agent (e.g., via ETW channels). Resource budgets can be set per query, or per instance of the agent.

Figure 3:
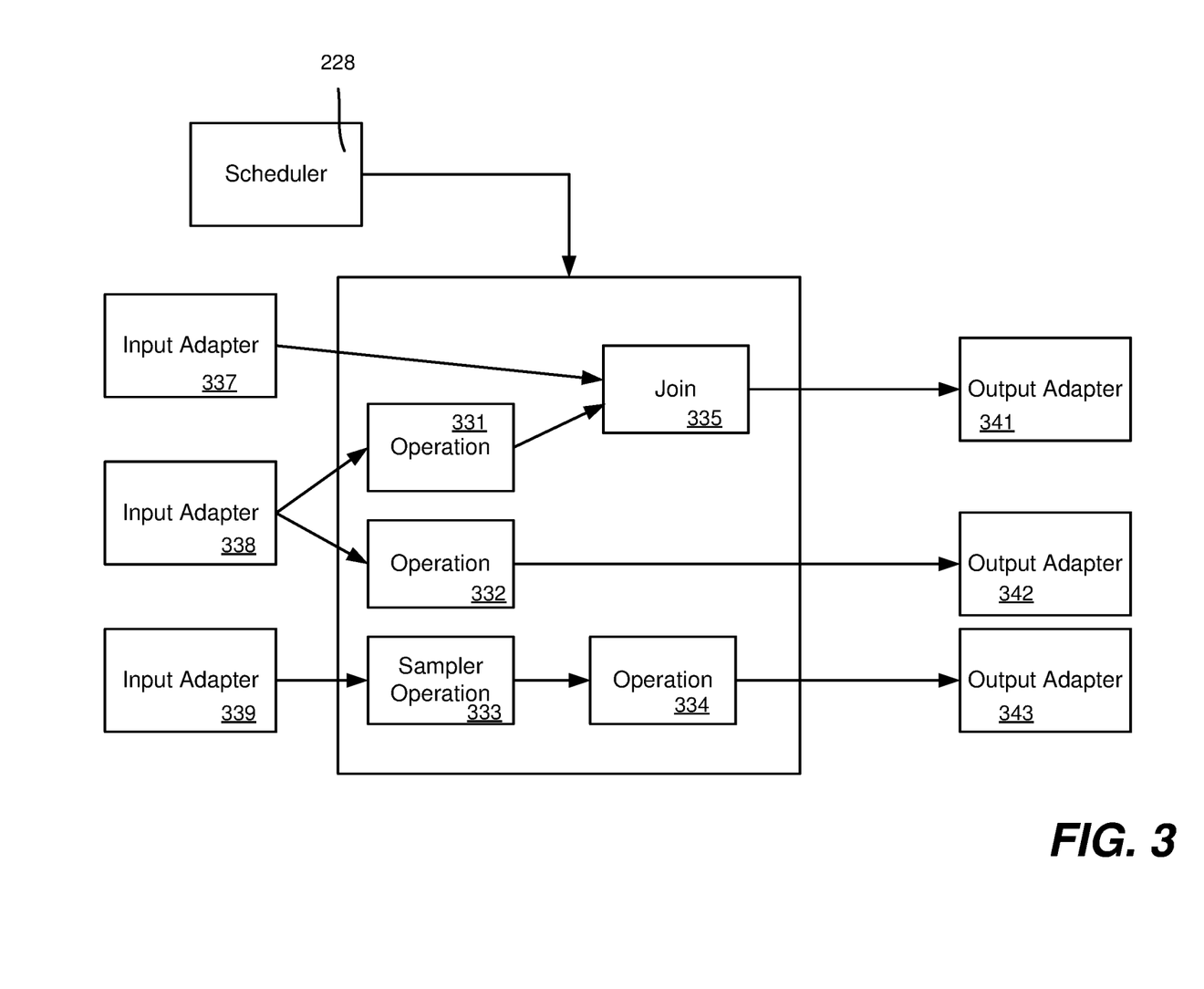
FIG. 3 is an example representation of how queries may be considered to form an input adapter-to-output adapter pipeline that can be controlled to limit an agent's resource usage.

By way of example, FIG. 3 represents a particular set of queries in which each query corresponds to a pipeline of operations 331-335 between input adapters 337-339 (corresponding to the data sources) and output adapters 341-343 that output the data. A join 335 may be one type of operation, as may a sample operation 333 (described below). The scheduler allocates resources and tracks resource usage among these queries.

When a query or the agent reaches a budget limit, various mitigations options may be taken by the scheduler 228. For example, the scheduler 228 tracks how many resources each query uses, including CPU, memory, data input and output, and so on. If a query is causing the budget problem, the policy is consulted to determine how to mitigate the problem. One mitigation option includes pausing the problematic query, while preserving the data in the pipeline. This is useful if temporary CPU limitations are the issue. Another mitigation option is to suspend the query, which preserves data in the pipeline, but drops incoming data; this is useful for CPU or memory limitations. The query may be stopped, which releases the memory associated with the query, and is thus useful for handling memory limitations. Another mitigation option is to run the query in a low-priority background thread that only runs when the machine is otherwise idle ("cycle scavenging"), which useful for non-real-time data analysis.

Other mitigation options include dynamic adaptation of the sampling rate of data streams and/or performing data aggregation in order to reduce the number of events in the system to response to resource limits. For example, instead of using all events received per timeframe, the sampler operation 333 may be controlled (according to policy) to aggregate or discard some number of the events, e.g., keep only one event per second instead of the ten events received. As an alternative to discarding, the sampler or other operation may combine the received data into some lesser amount of data, e.g., to output a maximum, a minimum, an average, a sum, and so forth; however in general some amount of the received data is filtered out when the sampler/operation is invoked/instructed by the query engine (the scheduler and/or a policy query) to do so. Another alternative is to delay query processing by logging events to disk/storage rather than run (some or all of) the queries, such as when a spike in resource usage is occurring, and then process the events at a later time when needed resources are again available.

Note that a query may be written to detect an anomaly such as a CPU usage spike, and cause a dump of very detailed logs at that time, and possibly for some time period before that time (by regularly keeping some amount of past data in anticipation of a detailed data dump). This is highly useful in debugging, as the log can show data corresponding to what led up to the spike, rather than the conventional method of having to wait for a spike to again occur in order to capture the data.

Consider monitoring performance counters, e.g., getting the data of some number of counters every few seconds. Some counters such as process counters are dynamic, as they depend on the number of processes running, which may change regularly. According to policy, the scheduler 228 may adapt to the current state so as to stay within the resource budget, e.g., slow the rate of getting the data from the process (and/or other) counters when there are too many relative to the current rate, not monitor the process counters, and so forth.

Such queries may go back to normal functioning when resource budgets permit. Queries can be prioritized, with lower priority queries required to release resources before higher priority queries.

The policy and associated resource usage enforcement mean that an agent's queries can be dynamically changed without requiring re-qualification for any change. Indeed, a poorly written query will not cause harm, and will likely be suspended or paused, and identified to the system administrator as a possible culprit. Further, note that various levels of policy/safety may be enforced, e.g., a hard budget may be defined by a super-policy, with coarse-grained mechanisms (e.g., suspending queries) used to enforce the hard budget. Subject to staying within the hard budget, various subordinate policy budgeting mechanisms, corresponding to fine-grained mechanisms such as sampling, may be attempted to keep within the hard budget. In this way, if a subordinate policy is poorly written, for example, the super-policy still prevents the resource budget from being exceeded.

In this manner, the agent $106_1$ collects data from the server $104_1$ as defined by the currently loaded queries. The controller 102 obtains (e.g., asynchronously) the server data and analyzes the data. As can be readily appreciated, the controller 102 has the resources and time to analyze the server's data (which as a separate machine it can do without impacting the monitored server's performance) so as to identify troublesome patterns of usage. The controller 102 may accordingly adjust the server's monitoring and/or alert the system administrator about problems.

In general, the controller 102 has fewer limitations on data storage than an agent with respect to monitoring, and can therefore keep sufficient historical data to adjust the data collection and alerting, including taking into consideration various seasonal effects, e.g., not just weekly but also monthly and yearly. Statistical analysis may be done to determine normal patterns for any situation.

Further, the controller 102 may use data and the analysis results of one server that is performing a given application to adjust the monitoring parameters on some other server performing the same or a similar application. For example, a newly repurposed or added server can be efficiently configured with alerts and data collection parameters appropriate to its new role, despite having no previous history with respect to that application.

Moreover, in one typical implementation, the controller 102 collects and analyzes the monitoring data collected from a relatively large number of servers, such as from all the servers in a datacenter (or some subset thereof, with other subsets handled by one or more other controllers). In large datacenters, it is likely that more than only one server is running the same (or similar) application as a newly repurposed or added server. If so, the controller 102 is able to configure that newly repurposed or added server with a monitoring configuration taken from a server that is not only running the same (or a similar) application, but from one that has other similar machine configuration parameters, e.g., the same or similar hardware configuration, processor type and the like.

As the controller 102 collects and analyzes monitor data from multiple servers, the controller 102 also may monitor and alert on inter-server problems, including imbalanced load or lack of inter-server communication. Indeed, the controller 102 can raise new class of inter-server alerts to system administrators. At the same time, upon discovering inter-server problem, the controller 102 can reset the data collection and alert rules on individual servers, whereby the system administrator is not flooded with spurious alerts from individual servers.

Note that while an agent collects only the data from the server (or groups of servers) that it monitors, in the data center, other kinds of monitors collect other types of data, such as electric power data for a rack of servers, network data from the networking backbone and associated hardware, environmental data (e.g., temperature) and so forth. The controller 102 may combine these other types of data with the agent-monitored server data to further improve the analysis and detection of patterns in the servers.

By way of summary, the agents $106_1$-$106_n$ monitor their respective servers $104_1$-$104_n$ according to their current queries, with the results of the queries pushed or pulled to a data warehouse 112. The data may be received daily, hourly or at any other specified interval, and possibly via events that are fired as they occur, independently of any interval.

The controller 102 retrieves the data from the data warehouse 112 and analyzes it to determine the typical operating characteristics of each server or server type. For example, based on the data obtained from the agents, which may be combined with data from other data sources, the controller computes the typical operating characteristics of each server in the datacenter so as to prepare new queries, as described below. Examples of such other data sources include inventory data 122 (e.g., a list) showing the hardware configuration and capacity of each server, the role assigned to each server, the type and priority of each process/function being conducted by the server, and so forth.

To compute the typical operating characteristics, any of several suitable known techniques may be used, as well as others developed in the future. For example, Holt-Winter; compressed sensing, fitting of a Gaussian or other distribution to the data, k-means clustering and/or the like may be implemented. Additionally, the controller 102 may compare the current situation in the system with a past situation, (e.g., that of one year or one week ago) to help decide what are appropriate levels of alerts for that period of time based on historical data (in the data warehouse 112).

The controller 102 may employ other means of system data analysis to identify potentially troublesome situations in the system, corresponding to analysis results that identify data patterns indicating troublesome situations in the system. These patterns may be used by the controller 102 to set the appropriate alert and warning parameters for the agent monitoring. For example, the controller may formulate a query that outputs a value (e.g., to a command table 240, FIG. 2) when a pattern indicates a troublesome situation, whereby the scheduler may take an appropriate action. Note that in one implementation, the policies may be expressed as queries, and thus also may update the command table 240 as conditions vary, e.g., turn on the sampler if the CPU usage exceeds fifty percent.

When the controller 102 receives information that indicates a server is operating outside of its typical operating characteristics, the controller 102 takes appropriate action, such as generating an alert (block 120) to the system's operators, and/or posting information that may be useful to them in debugging the situation to a known location for review. The controller also may use its store of information (112 and 122 in FIG. 1) to produce reports (block 120) on the general health and utilization of the data center and its servers.

While conducting the above-described analysis, the controller 102 also may send alerts (block 120) about any unusual load patterns seen during the time periods being analyzed. Because the controller 102 has access to the configuration data and historical data of many other servers, the controller 102 is able to use that data to determine whether there are any inter-server problems occurring, such as improper load balancing, and alert about such problems. When such an imbalance is discovered, the (spurious) alerts generated for the individual underloaded/overloaded servers may be quashed or ignored as a form for root cause analysis or alert correlation.

As also represented in FIG. 1, a monitoring information set 130 comprising new queries created by the controller are deployed to the agents. These new queries may be directed towards producing data that verifies that the server remains inside its typical operating characteristics and/or provides information that characterizes under what conditions or sequence of events the server exhibits unusual operating characteristics. The queries also may be used to refine the characterization of the server's typical operating characteristics, as these may change over time.

In the exemplified implementation of FIG. 1, query deployment (indicated by dashed lines to differentiate them from the data collection part of the loop) is accomplished by providing the new queries 130 to an agent configurator 132 to be communicated (e.g., pushed) to the appropriate agent or agents, e.g., via control message queries $134_1$-$134_n$. The agent configurator 132 maintains an agent configuration database 136 or the like for this purpose. The controller 104 may perform the deployment occasionally or periodically (e.g., once per day), and (if not included in the queries) may send other monitoring parameters to the agent in the monitoring information set, e.g., system counters to collect, the collection intervals and possibly other data; such other data may identify the post-processing operations that the agent is to perform so as to receive desired results (e.g., in an appropriate format such as a histogram). Upon receiving the queries and/or monitoring parameters, the agent correspondingly adjusts (as needed) what information on its server is monitored, how it is analyzed, and/or what information is reported back to the controller.

Figure 4:
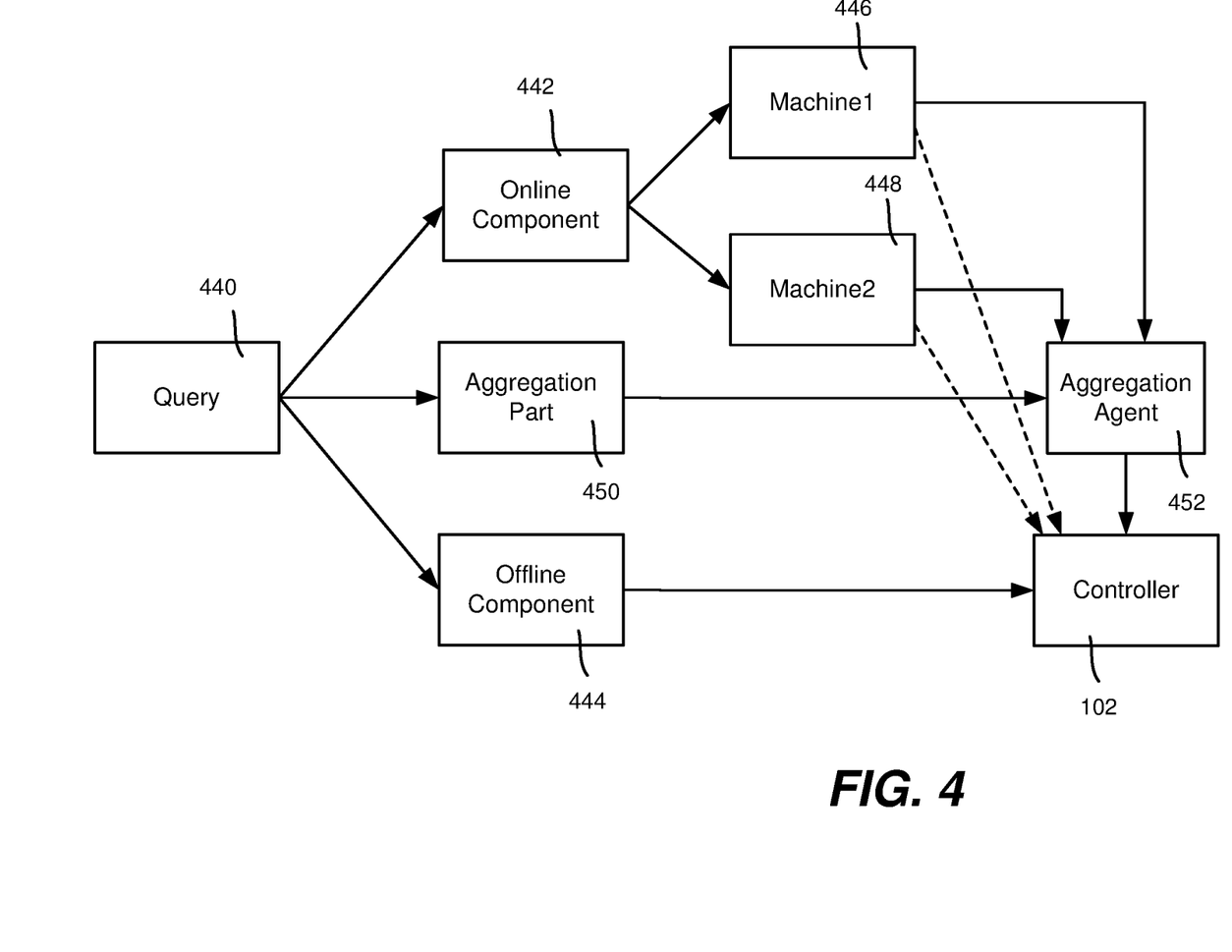
FIG. 4 is an example representation of how a query may be processed into online and offline (and aggregation) parts for collecting data from network server machines.

Further, as generally represented in FIG. 4, a query 440 may have an online component 442 and an offline component 444. For example, an administrator may want to execute a query that combines information from different machines. The online part or parts of the query, corresponding to an individual machine (e.g., 446 and 448), may be extracted and sent to the respective machine's agents, while the offline part of the query is used by the controller 102 to combine the data for analysis when the returned data (the dashed lines) is later processed.

An alternative is to have an aggregation part 450 and an aggregation agent 452, which may be used to combine the data from multiple machines (e.g., 446 and 448) in some way before providing it to the controller 102. The aggregated data may be further combined offline with other data. Note that in FIG. 4 the machines are shown as being able to process online queries, however there may not be an online component, and a monitored machine may simply provide some raw data to the aggregation agent 452.

As can be seen, there is provided a system including agents that collect and process data from servers, in combination with a controller that alters future data to be collected, the mechanisms for collecting it, and/or the processing algorithms used by the agent based on data analysis. This forms a loop of data collection, analysis that results in modified data collection, further analysis on the modified data collection to again modify the data collection, and so forth.

Exemplary Operating Environment

Figure 5:
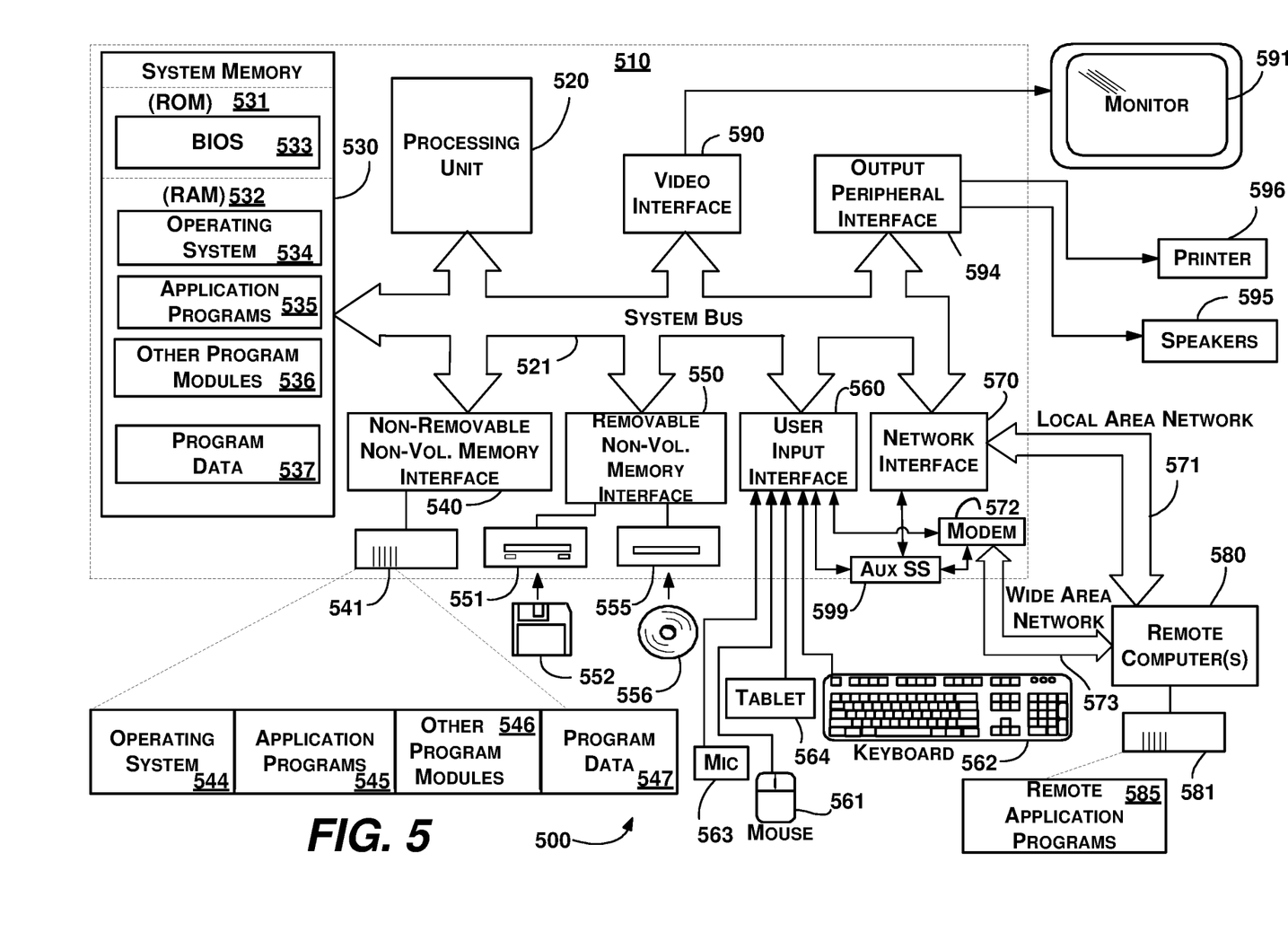
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising:
   at least one processor;
   a dynamic query engine, implemented on the at least one processor, comprising:
   an agent that runs one or more queries on a server to collect monitoring data from one or more data sources; and
   a scheduler that monitors resource usage of the one or more queries and dynamically modifies at least one query of the one or more queries or monitoring parameters based on a super-policy specified for the agent and the monitored resource usage in order to remain within a hard resource budget of the super-policy as the agent continues to collect the monitoring data, wherein at least one subordinate policy with another resource budget is associated with the at least one query, the super-policy preventing the at least one subordinate policy from exceeding the hard resource budget as the dynamic query engine collects the monitoring data and self-monitors its own resource usage.

2. The system of claim 1, wherein the at least one subordinate policy is suspended or paused responsive to the at least one subordinate policy attempting to exceed the hard resource budget of the super-policy.

3. The system of claim 1, wherein the scheduler dynamically modifies a query of the one or more queries by pausing the query, suspending the query, stopping the query or changing a resource priority of the query.

4. The system of claim 1, wherein the scheduler further estimates a resource requirement of creating an event corresponding to the one or more queries and includes the estimate in monitoring the resource usage of the one or more queries.

5. The system of claim 1, wherein the dynamic query engine logs at least some of the data provided by at least one data source for later processing as more resources become available.

6. The system of claim 1, wherein the at least one subordinate policy controls the resource usage of the at least one query by at least one of: changing at least one monitoring parameter, modifying the one or more data sources the at least one query is using, modifying the rate at which the at least one query pulls data from the one or more data sources, modifying the calculations the at least one query performs on the data obtained from the one or more data sources, modifying the method for saving or transferring the data obtained, performing sampling, or combining the data obtained into a lesser amount of data.

7. The system of claim 1, wherein the super-policy controls resource usage of the agent by at least one of: pausing one or more queries, suspending one or more queries, stopping one or more queries or changing a resource priority of one or more queries responsive to the subordinate policy being unable to control the resource usage of the at least one query to remain within the resource budget.

8. The system of claim 7 wherein an individual resource budget is set per query of the one or more queries.

9. The system of claim 1 wherein the hard resource budget is set per instance of the agent.

10. The system of claim 1, wherein responsive to the agent reaching a limit of the hard resource budget, the scheduler further operates to identify a resource amount used per query of the one or more queries, and responsive to the scheduler identifying a query of the one or more queries as a cause of the agent reaching the limit, determine a mitigation action for the identified query based on the super-policy.

11. In a computing environment, a system comprising:
    one or more servers;
    one or more dynamic query engines implemented on the one or more servers and operating to:
    collect data related to monitoring the one or more servers via one or more queries;
    monitor resource usage during the data collection;
    enforce a hard resource budget associated with a super-policy during the data collection, and at least one subordinate policy associated with a query of the one or more queries, the super-policy preventing the at least one subordinate policy from exceeding the hard resource budget as the one or more dynamic query engines collect the data and self-monitors its own resource usage; and process the collected data into monitoring results for the one or more servers.

12. The system of claim 11, wherein an individual query engine of the one or more dynamic query engines further comprise:

an agent configured to run the one or more queries and collect the data; and a scheduler configured to monitor resource usage of the agent with respect to the hard resource budget and dynamically modify at least one of the one or more queries based on the super-policy associated with the hard resource budget as the agent collects the data.

13. The system of claim 12, wherein the scheduler dynamically modifies a query of the one or more queries by pausing the query, suspending the query, stopping the query or changing a resource priority of the query.

14. The system of claim 12, wherein the at least one subordinate policy is suspended or paused responsive to the at least one subordinate policy attempting to exceed the hard resource budget of the super-policy.

15. The system of claim 11, further comprising:

an aggregation agent implemented on a server other than the one or more servers, the aggregation agent operating to:

receive the monitoring results from the one or more dynamic query engines; and aggregate the received monitoring results for analysis by a controller.

16. The system of claim 15, wherein the controller separates a query into an online component and an offline component, the controller reconfiguring a dynamic query engine with the online component, and using the offline component to combine results from an individual server associated with the dynamic query engine corresponding to the online component with results received from another server.

17. In a computing environment, a method performed on at least one processor comprising:

running, by a dynamic query engine, one or more queries on a server to collect monitoring data from one or more data sources associated with the server;

monitoring resource usage of the dynamic query engine with respect to a hard resource budget specified by a super-policy during the monitoring data collection, the super-policy including one or more subordinate policies, the super-policy specified for the dynamic query engine and the one or more subordinate policies associated with the one or more queries; and dynamically modifying at least one query of the one or more queries or monitoring parameters during the monitoring data collection based on the monitored resource usage in order to remain within the hard resource budget as the dynamic query engine continues to collect the monitoring data and self-monitors its own resource usage.

18. The method of claim 17, further comprising:

detecting an attempt to exceed the hard resource budget of the super-policy by at least one subordinate policy of the one or more subordinate policies; and responsive to detecting the attempt, suspending or pausing the at least one subordinate policy to remain within the hard resource budget of the super-policy during the monitoring data collection.

19. The method of claim 17, wherein dynamically modifying at least one query of the one or more queries further comprises at least one of:

pausing the at least one query;

suspending the at least one query;

stopping the at least one query; or changing a resource priority of the at least one query.

20. The method of claim 17, further comprising:

estimating a resource requirement of creating an event corresponding to the one or more queries; and including the estimate in monitoring the resource usage of the dynamic query engine relative to the one or more queries.

\* \* \* \* \*